United States Patent
Grechi et al.

(10) Patent No.: US 10,988,612 B2
(45) Date of Patent: Apr. 27, 2021

(54) POLYMER COMPOSITION BASED ON THERMOPLASTIC COPOLYESTER ELASTOMER, MANUFACTURED ARTICLE MADE WITH SUCH POLYMER COMPOSITION AND PRODUCTION PROCESS OF SUCH POLYMER COMPOSITION

(71) Applicant: CELANESE INTERNATIONAL CORPORATION, Irving, TX (US)

(72) Inventors: Denis Grechi, Forli-Cesena (IT); Stefano Zocca, Forli-Cesena (IT)

(73) Assignee: CELANESE INTERNATIONAL CORPORATION, Irving, TX (US)

( * ) Notice: Subject to any disclaimer, the term of this patent is extended or adjusted under 35 U.S.C. 154(b) by 373 days.

(21) Appl. No.: 15/758,051

(22) PCT Filed: Sep. 8, 2016

(86) PCT No.: PCT/IB2016/055353
§ 371 (c)(1),
(2) Date: Mar. 7, 2018

(87) PCT Pub. No.: WO2017/042707
PCT Pub. Date: Mar. 16, 2017

(65) Prior Publication Data
US 2018/0258280 A1    Sep. 13, 2018

(30) Foreign Application Priority Data

Sep. 9, 2015   (IT) .................. 102015000049765

(51) Int. Cl.
| | |
|---|---|
| *C08J 9/04* | (2006.01) |
| *C08J 9/06* | (2006.01) |
| *C08J 9/12* | (2006.01) |
| *C08L 67/02* | (2006.01) |
| *C08J 9/00* | (2006.01) |
| *C08J 9/08* | (2006.01) |
| *C08J 9/32* | (2006.01) |
| *A43B 13/04* | (2006.01) |
| *C08G 63/183* | (2006.01) |
| *C08G 63/189* | (2006.01) |
| *C08G 63/88* | (2006.01) |

(52) U.S. Cl.
CPC ............ *C08L 67/025* (2013.01); *A43B 13/04* (2013.01); *C08G 63/183* (2013.01); *C08G 63/189* (2013.01); *C08G 63/88* (2013.01); *C08J 9/0023* (2013.01); *C08J 9/08* (2013.01); *C08J 9/32* (2013.01); *C08G 2120/00* (2013.01); *C08G 2410/00* (2013.01); *C08J 2203/02* (2013.01); *C08J 2203/184* (2013.01); *C08J 2203/22* (2013.01); *C08J 2207/00* (2013.01); *C08J 2300/26* (2013.01); *C08J 2367/02* (2013.01); *C08L 2207/04* (2013.01)

(58) Field of Classification Search
CPC .... C08L 67/025; C08L 2207/04; A43B 13/04; C08G 63/183; C08G 63/189; C08G 63/88; C08G 2120/00; C08G 2410/00; C08J 9/08; C08J 9/32; C08J 9/0023; C08J 2300/26; C08J 2207/00; C08J 2203/02; C08J 2203/184; C08J 2203/22; C08J 2367/02
See application file for complete search history.

(56) References Cited

U.S. PATENT DOCUMENTS 4,720,524 A * 1/1988 Ohmae ................ C08G 63/672
525/173
5,540,794 A * 7/1996 Willer .................... C06B 45/10
149/100

FOREIGN PATENT DOCUMENTS

| EP | 0109123 A1 | 5/1984 |
| EP | 0596734 A1 | 5/1994 |
| EP | 0755967 A1 | 1/1997 |
| EP | 2543698 A1 | 1/2013 |

* cited by examiner

*Primary Examiner* — Kara B Boyle
(74) *Attorney, Agent, or Firm* — Arent Fox LLP; Michael Fainberg

(57) ABSTRACT

The invention relates to a polymer composition based on thermoplastic copolyester elastomer comprising: —from 90% to 70% by weight of the thermoplastic copolyester elastomer containing ester and ether bonds; —from 5% to 25% by weight of one or more saturated esters with a molecular weight between about 200 and 1,000, and preferably between 300 and 380; —from 2 to 10% by weight of expanding additives. This invention also covers a manufactured article obtained by injection moulding a predefined amount of the polymer composition according to this invention, as well as a production process of such polymer composition.

46 Claims, No Drawings

POLYMER COMPOSITION BASED ON THERMOPLASTIC COPOLYESTER ELASTOMER, MANUFACTURED ARTICLE MADE WITH SUCH POLYMER COMPOSITION AND PRODUCTION PROCESS OF SUCH POLYMER COMPOSITION

CROSS-REFERENCE TO RELATED APPLICATIONS

This application is the U.S. National Stage Application of International Patent Application No. PCT/IB2016/055353, filed on Sep. 8, 2016, which claims priority to Italian Patent Application No. 102015000049765, filed on Sep. 9, 2015, the contents of each of which is incorporated herein by reference in its entirety.

FIELD OF APPLICATION

This invention relates to a polymer composition based on thermoplastic copolyester elastomer, a manufactured article made with such polymer composition and a production process of such polymer composition.

The polymer composition of the invention is particularly suitable for the injection moulding of manufactured articles in the field of automotive, technical sports accessories, fashion items and coating and still more particularly in the footwear field for the production of soles.

STATE OF THE ART

Normally aromatic thermoplastic copolyester elastomers are used in the injection moulding, extrusion and blow moulding of technical articles.

Copolyesters are produced through the etherification/transesterification and subsequent polycondensation of:
aromatic dicarboxylic acids and/or their methyl esters;
linear glycols of low molecular weight, comprised between 60 and 120;
polyester and/or polyether polyols of molecular weight varying between 400 and 3000.

The minimum hardness directly achievable in the aforesaid production process is of 25 Shore D (90 Shore A). In some types of applications, and in particular in the production of soles for footwear, this minimum hardness value can be excessively high, so as to prevent the use of the polymer.

It is known that the hardness thermoplastic copolyester elastomers can be lowered by introducing thermoplastic polymers in the polymer composition, such as silicone rubbers or acrylate terpolymers. This has the disadvantage of increasing the viscosity of the copolyester, thus making injection moulding more difficult, in particular in the case of the production of soles for footwear.

In many sectors, all this has imposed the use of other polymers.

Up to now, this has made the use of thermoplastic copolyester elastomers for the production of soles for footwear impossible.

There is therefore the need for polymer compositions based on thermoplastic copolyester elastomer characterised by lower hardness values achievable already at the end of the polymer production process, without the introduction of thermoplastic polymers.

As is known, in some application sectors, and in particular the sector of soles for footwear, in particular those for safety, anti-static properties are required for the polymers used. Generally, this property is imparted by mixing a suitable additive with the polymers, for example, amides. This solution is limited by the fact that the action of these additives is not permanent or, in any case, lasts less than the polymer.

There is thus also the need for polymer compositions comprising a thermoplastic copolyester elastomer having permanent anti-static propertied.

PRESENTATION OF THE INVENTION

Therefore, the purpose of this invention is to wholly or partially eliminate the drawbacks of the prior art mentioned above, by providing a polymer composition based on thermoplastic copolyester elastomer that, already at the end of the production process of the polymer, has hardness values significantly lower than those of the thermoplastic copolyester elastomers of the known type without introducing thermoplastic polymers.

A further purpose of this invention is to make available a polymer composition based thermoplastic copolyester elastomer that allows producing manufactured articles with permanent anti-static characteristics.

A further purpose of this invention is to make available a polymer composition based on thermoplastic copolyester elastomer that allows the production of manufactured articles having particularly marked characteristics of lightness.

A further purpose of this invention is to make available a production process of said polymer composition based on thermoplastic copolyester elastomer that is simple to manage.

The technical characteristics of the invention, according to the above-mentioned purposes, can be clearly understood from the claims listed below and its advantages will become more apparent from the detailed description that follows.

DETAILED DESCRIPTION

This invention relates to a polymer composition based on thermoplastic copolyester elastomer, a manufactured article made with such polymer composition and a production process of such polymer composition.

According to a general embodiment of the invention, the polymer composition based on thermoplastic copolyester elastomer comprises:
from 95% to 70% by weight of the thermoplastic copolyester elastomer containing ester and ether bonds;
from 5% to 25% by weight (and in particular between 5% and 20%) of one or more saturated esters with molecular weight between about 200 and 1,000, and preferably between 300 and 380;
from 0 to 10% by weight of expanding additives.

Preferably, the polymer composition according to the invention is in the form of granules, pellets or flakes obtained by extrusion and cutting or granulation.

As will be taken up in the following description, the polymer composition according to the invention can be realised according to two general formulations:
a formulation without expanding additives; and
a formulation with expanding additives.

According to the invention, the presence in the polymer composition of one or more saturated esters with molecular weight between about 200 and 1,000, and preferably between 300 and 380, in a quantity ranging from 5% to 25% by weight (and in particular between 5% and 20%) allows obtaining hardness values in manufactured articles made with such a composition:

between 65 and 75 Shore A, in the case of use of formulations without expanding additives, and;

between 50 and 70 Shore A, in the case of use of formulations with expanding additives.

Advantageously, the reduction of hardness values obtained thanks to the presence of these saturated esters in the amounts indicated above is obtained without impairing the mechanical and processing properties of the final copolyester elastomer.

According to a preferred embodiment of the invention, the aforesaid thermoplastic copolyester elastomer has an alternating structure defined by a multiplicity of randomly recurring long-chain ester units and short-chain ester units, joined together by head-to-tail chaining through ester bonds.

The long-chain ester units are represented by the formula:

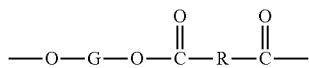

while the short-chain ester units are represented by the formula:

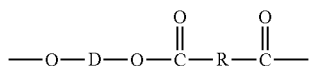

where:

G is a divalent group that remains after removal of terminal hydroxyl groups from a polyol having a molecular weight between about 250 and 6000;

R is a divalent group that remains after removal of carboxyl groups from a dicarboxylic acid having a molecular weight less than about 300;

D it is a divalent group remaining after removal of hydroxyl groups from a diol having a molecular weight less than about 250.

In the case of groups G and D, the expression "divalent group" means a group having two hydroxyl reactive centres positioned one at the head and one at the tail to the molecule. In the case of group R, the expression "divalent group" means a group having two carboxyl reactive centres positioned one at the head and one in the tail to the molecule.

Structurally, the R groups are the groups that provide the polyester bond. In particular, when the R groups have an aromatic part, they confer crystallinity to the copolyester.

The G groups in combination with the R groups confer the elastomer properties to the copolyester.

The D groups in combination with the R groups confer properties of rigidity to the copolyester Thanks to the alternating structure defined above, it is possible to obtain a thermoplastic copolyester elastomer with high molecular weights that constitutes a not excessively hard starting basis for the polymer composition according to the invention.

Preferably the above alternating structure comprising from 5% to 15% by weight of short-chain ester units and from 70% to 80% by weight of long-chain ester units.

Preferably, the alternating structure thermoplastic copolyester elastomer, is obtained according to the following general reaction scheme:

esterification/transesterification of one or more dicarboxylic acids, of one or more esters of dicarboxylic acids and/or of one or more dimer or trimer carboxylic acids with diols and with diol polyglycols.

subsequent polycondensation of the products of esterification/transesterification.

The esters of dicarboxylic acids and the dimer or trimer carboxylic acids have a molecular weight greater than 300 and the corresponding carboxylic acid has a molecular weight less than 300.

The reaction is called esterification in the case in which dicarboxylic acids are involved, while it is called transesterification when esters are involved.

In more detail, the long-chain ester units are the reaction products of the esterification/transesterification of one or more diol polyglycols selected from the group consisting of:

polytetramethylene glycols;

polypropylene glycols and their copolymers derived from ethylene oxide;

polyoxyethylene glycols;

polybutadiene glycols;

polycarbonates glycols;

diol polycaprolactones;

diols from dimer acid.

Preferably, the diol polyglycols involved in the esterification/transesterification reactions for the production of long-chain ester units are selected from the group consisting of: poly(tetramethylene ether) glycol (PTMEG); polyoxyethylene glycol (PEG); or a mixture of the two.

The short-chain ester units are the reaction products of the esterification/transesterification of one or more diols with molecular weight not greater than 250.

Advantageously, the aforesaid one or more diols involved in the esterification/transesterification reactions for the production of short-chain ester units are selected from among the aliphatic diols, and preferably in the group consisting of:

monoethylene glycol;

diethylene glycol;

hexanediol;

propanediol;

1,4 butanediol; and a mixture of two or more of them.

According to a particularly preferred embodiment, the short-chain ester units are the reaction products of the esterification/transesterification of 1,4-butanediol.

Advantageously, in the above esterification reactions, the aforesaid one or more dicarboxylic acids are selected from the aliphatic dicarboxylic, cycloaliphatic or aromatic acids with molecular weight less than about 300.

Preferably, the aforesaid one or more dicarboxylic acids are selected from the group consisting of:

adipic acid;

mixtures of adipic acid, succinic acid and sebacic acid;

terephthalic acid;

isophthalic acid;

azelaic acid;

cyclohexanedicarboxylic acid;

naphthalene dicarboxylic acid; and a mixture of two or more of them.

According to a particularly preferred embodiment, the aforesaid one or more dicarboxylic acids are selected from the group consisting of: terephthalic acid; isophthalic acid; or a mixture of the two.

The dicarboxylic acids can contain any substituent group or combination of substituent groups that does not interfere substantially with the formation of the polymer and with the use of the polymer in the final products according to this invention.

Advantageously, in the aforesaid transesterification reactions, the aforesaid one or more esters of dicarboxylic acids are selected from the dimethyl esters of the following acids: adipic acid; mixtures of adipic acid, succinic acid and sebacic acid; terephthalic acid; isophthalic acid; azelaic acid; cyclohexanedicarboxylic acid; naphthalene dicarboxylic acid.

According to a particularly preferred embodiment, the aforesaid one or more esters of dicarboxylic acids are selected from the dimethyl esters of the following acids: terephthalic acid; isophthalic acid; or a mixture of the two.

Advantageously, for the purpose of avoiding subjecting the polymer to a high temperature for an excessive time, with the possibility of irreversible thermal degradation, the aforesaid alternating-structure thermoplastic copolyester elastomer is obtained by adding an esterification/transesterification catalyst to the mixture of reactants.

In particular, the aforesaid catalyst is selected from the organic titanates, or from the complex titanates derived from alkali metal or alkaline-earth alkoxides and esters of titanic acid. Preferably, the aforesaid catalyst is titanium tetrabutylate, used alone or in combination with magnesium or calcium acetates.

The reactive scheme of esterification/transesterification and subsequent polycondensation is in itself well known to a technician in the field and will therefore not be described in greater detail for simplicity of exposition.

For easy reference, the general reactive scheme in the case of transesterification of dimethyl terephthalate (DMT) with a polyglycol is provided below. In the I stage, transesterification occurs and, in the II stage, polycondensation. In the case in which the ester (DMT) is replaced by a carboxylic acid, it is called esterification, but the reactive scheme remains substantially unchanged.

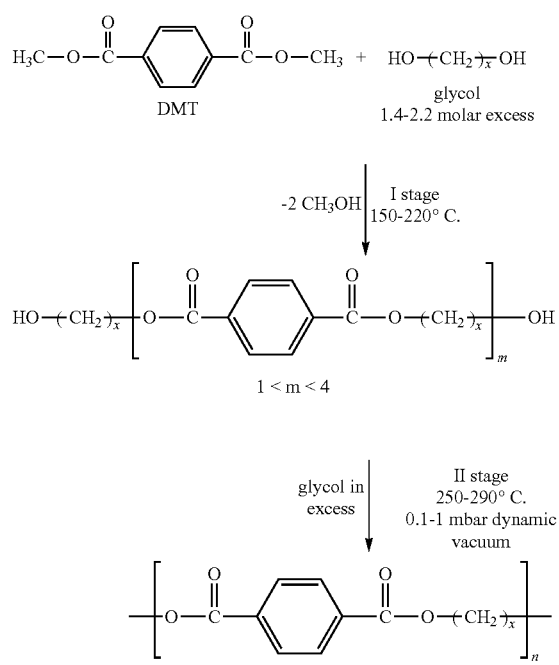

According to a preferred embodiment, the aforesaid one or more saturated esters with a molecular weight between about 200 and 1,000, are selected from the group consisting of:
diethylhexyl adipate (also known as dioctyl adipate);
dipropylene glycol dibenzoate;
diethylene glycol dibenzoate;
triethyl citrate; and
a mixture of two or more of them.

According to a particularly preferred embodiment, the aforesaid one or more saturated esters with a molecular weight between about 200 and 1,000, and preferably comprised between 300 and 380, are selected from the group consisting of:
diethylhexyl adipate;
dipropylene glycol dibenzoate;
diethylene glycol dibenzoate;
triethyl citrate;
acetyltributylcitrate;
acetyl triethyl citrate and
a mixture of two or more of them.

Operationally, the aforesaid one or more saturated esters are added to the molten thermoplastic copolyester elastomer at the end of the polycondensation reaction or to the solid granulated thermoplastic copolyester elastomer, in the drying and curing step.

In more detail, in the case of addition to the molten polymer, once the polycondensation reaction ended, the saturated esters are added directly into the reactor (with batch technology) or at the exit of the reactor through the use of a static mixer.

In the case of addition to the finished polymer, the saturated esters are added to the copolyester in a rotational mixer heated by a diathermic oil circuit that increases the temperature of the polymer up to 100° C. After the addition of the saturated esters, the mass is left at this temperature for a period ranging from 8 to 24 hours. Subsequently, the mass is cooled and discharged.

As was mentioned above, the polymer composition according to the invention can be realised according to two general formulations:
a formulation without expanding additives; and
a formulation with expanding additives.

In the case of formulation without expanding additives, the polymer composition consists of:
from 95% to 75% by weight of the thermoplastic copolyester elastomer containing ester and ether bonds; and
from 5% to 25% by weight of one or more saturated esters with a molecular weight between about 200 and 1,000, and preferably between 300 and 380.

In the case of formulation with expanding additives, the polymer composition consists of:
from 90% to 70% by weight of the thermoplastic copolyester elastomer containing ester and ether bonds;
from 5% to 25% by weight of one or more saturated esters with a molecular weight between about 200 and 1,000, and preferably between 300 and 380; and
from 2 to 10% by weight of expanding additives.

Preferably, in the case of formulation with expanding additives, the polymer composition consists of:
from 90% to 70% by weight of the thermoplastic copolyester elastomer containing ester and ether bonds;
from 5% to 20% by weight of one or more saturated esters with a molecular weight between about 200 and 1,000, and preferably between 300 and 380; and
from 2 to 10% by weight of expanding additives.

The above formulations do not exclude the presence of traces of other additives, such as dyes, antioxidants or stabilisers.

Advantageously, the aforesaid expanding additives are constituted by a mixture of physical and chemical expanding agents.

Preferably, the mixture of expanding agents has a weight ratio between physical and chemical expanding agents between 1:1 to 1:10, and still more preferably between 1:1 and 1:4.

According to a preferred embodiment, with respect to the polymer composition, the aforesaid expanding additives are constituted by:
- 1.5% to 5.0% by weight of physical expanding agents, preferably microspheres with swelling agent; and
- 0.5% to 5.0% by weight of chemical type expanding agents, preferably gas-developing type agents composed of sodium bicarbonate and citric acid.

According to a particularly preferred embodiment, the expanding additives (chemical and/or physical) are present from 3% to 6% by weight. In this case, preferably, said expanding additives are constituted by:
- 2.5% to 4.5% by weight of physical expanding agents, preferably microspheres with swelling agent; and
- 0.5% to 1.5% by weight of chemical type expanding agents, preferably gas-developing type agents composed of sodium bicarbonate and citric acid.

Operationally, the aforesaid expanding additives are added, through mixing, to the molten thermoplastic copolyester elastomer at the end of the polycondensation reaction in a mixer (Static Mixer).

Alternatively, the aforesaid expanding additives are added to the molten thermoplastic copolyester elastomer in an extruder (for example a compounding twin-screw extruder) in the step of shaping the polymer composition into pellets or granules.

In both cases, during the addition of the expanding additives, the copolyester is cooled or maintained at a temperature not exceeding 130° C. to prevent decomposition of the expanding agents.

The polymer composition with added expanding agents can be used in the form of granules or pellets to realise manufactured articles by injection moulding. Advantageously, these are self-expanding polymer composition granules or pellets. In fact, the expansion of the polymer matrix is induced by activation of the expanding agents by simply bringing the polymer composition in the extruder to temperatures above 130° C., and preferably between 130° C. and 170° C.

According to a particularly preferred embodiment, the thermoplastic copolyester elastomer comprises from 5% to 20% by weight of polymer segments defined by divalent groups that remain after removal of terminal hydroxyl groups from polyethylene glycol (PEG) with molecular weight between 400 and 4,000, and preferably between 1,000 and 3,000, and still more preferably equal to 2,000.

It has been noted that the presence of such polymer segments deriving from PEG allows a greater absorption of water by the copolyester such that the final material has anti-static properties. Such anti-static properties are of the permanent type since the aforesaid segments are not present in the form of additives in the polymer matrix, but are incorporated into the polymer structure of the copolyester itself. The effect of these segments thus has a duration equal to that of the copolyester, unlike the effects generated by any additives that, over time, are instead released from the polymer matrix and dispersed in the environment.

This invention covers a manufactured article obtained by injection moulding a predefined amount of the polymer composition according to this invention.

In particular, the manufactured article can be made using the polymer composition in the formulation without expanding agents to give the manufactured article a compact structure.

The manufactured article in compact form has a density between 1.03 $g/cm^3$ and 1.09 $g/cm^3$ and hardness of between 65 and 75 Shore A.

The manufactured article can also be made using the polymer composition in the formulation with expanding agents to give the manufactured article an expanded and thus more light structure. This expanded structure is induced by the activation of the physical and chemical expanding agents during the injection of the molten polymer composition, which preferably is carried out at temperatures between 130° C. and 170° C.

The manufactured article in expanded form has a density between 0.3 $g/cm^3$ and 0.8 $g/cm^3$ and hardness of between 50 and 70 Shore A.

According to a particularly preferred embodiment, the aforesaid manufactured article is obtained by injection moulding of a predefined amount of the polymer composition, wherein the thermoplastic copolyester elastomer of said polymer composition comprises from 5% to 20% by weight of polymer segments defined by divalent groups that remain after removal of terminal hydroxyl groups from polyethylene glycol (PEG) with molecular weight between 400 and 4,000, and preferably between 1,000 and 3,000, and still more preferably equal to 2,000. This manufactured article can be realised both in the compact version and the expanded version.

In more detail, the aforesaid manufactured article has a surface resistivity on the order of $10^{10}$ and a volume resistivity in the order of 120 MO.

According to what is known in the literature, these values correspond to antistatic properties as indicated in Table 1 below:

TABLE 1

| surface resistivity $\Omega$ | | | volume resistivity M$\Omega$ | |
| --- | --- | --- | --- | --- |
| from | to | definition | from | to |
| $10^2$ | $10^4$ | CONDUCTIVE | <0.1 | 0.1 |
| $10^5$ | $10^{12}$ | ANTI-STATIC | 0.1 | 1,000 |
| $10^{13}$ | over | INSULATION | 1,001 | over |

According to a particularly preferred embodiment, the aforesaid manufactured article is a sole for footwear, in particular for safety shoes. Preferably, in the case in which the manufactured article is a sole for footwear, it is made using the polymer composition, in which the thermoplastic copolyester elastomer comprises from 5% to 20% by weight of polymer segments defined by divalent groups that remain after removal of terminal hydroxyl groups from polyethylene glycol (PE) with molecular weight between 400 and 4,000, and preferably between 1,000 and 3,000, and still more preferably equal to 2,000. In this way the sole has permanent anti-static properties.

This invention covers a production process of the polymer composition based on thermoplastic copolyester elastomers according to the invention, and in particular of the polymer composition as described above.

This process comprises the following operating steps:

a) introducing in a first reactor one or more dicarboxylic acids, one or more esters of dicarboxylic acids and/or one or more dimer or trimer carboxylic acids, the esters of dicarboxylic acids and the dimer or trimer carboxylic acids having a molecular weight greater than 300 and the corresponding carboxylic acid having a molecular weight less than 300;

b) introducing in said first reactor diols and diol polyglycols to mix them with the reagents indicated in step a);

c) inducing, in said first reactor between the reactants in steps a) and b), reactions of esterification/transesterification;

d) transferring the reaction products of esterification/transesterification in a second reactor and inducing polycondensation reactions of said reaction products to obtain a thermoplastic copolyester elastomer;

e) adding to said thermoplastic copolyester elastomer one or more saturated esters with a molecular weight between about 200 and 1,000, and preferably between 300 and 380, in an amount such that said saturated esters constitute from 5% to 25% by weight of the total polymer composition; and f) granulating the polymer composition to bring it in the form of solid granules or pellets.

Advantageously, steps a) and b) of introducing reactants in the first reactor may be conducted simultaneously.

Preferably, step e) of adding one or more saturated esters is conducted on the molten polymer at the end of polycondensation, or in granulation step f).

According to a preferred implementation of the invention, the production process comprises a step g) of adding a mixture of physical and chemical expanding agents to the thermoplastic copolyester elastomer. This adding step g) is conducted on the molten polymer at the end of polycondensation, or in granulation step f). In both cases, the polymer is first brought to a temperature not exceeding 130° C.

Preferably, the mixture of reactants introduced in the first reactor in steps a) and b) is constituted by:

from 20% to 40% by weight of one or more dicarboxylic acids, of one or more esters of dicarboxylic acids and/or of one or more dimer or trimer carboxylic acids; and from 60 to 80% of a mixture of diols and diol polyglycols.

More details on the production process of the polymer composition according to the invention are provided in the examples that follow.

Furthermore, what was previously stated in the direct description of the polymer composition relating to the characteristics and production methods of the composition also applies to the production process explicitly claimed, in all possible combinations.

For simplicity of explanation these characteristics are not repeated in explicitly direct description of the production process.

EXAMPLES

In order to allow a better understanding of this invention, some purely illustrative and non-limiting examples are provided below.

All parts and proportions indicated below are to be understood by weight unless otherwise specified.

The following reactants are placed in an autoclave equipped with distillation column, variable-speed stirrer and temperature control system:

dimethyl terephthalate and/or terephthalic acid;
1,4 butanediol;
poly(tetramethylene ether) glycol (PTMEG) with MW of about 2,000;
polyethylene glycol (PEG) with MW equal to about 2,000;

according to the amounts shown in Table 2 below.

TABLE 2

|  |  | Example 1 | Example 2 | Example 3 | Example 4 | Example 5 |
|---|---|---|---|---|---|---|
| dimethyl terephthalate and/or terephthalic acid | kg | 5 | 5 | 5 | 5 | 5 |
| PTMEG MW 2000 | kg | 13.4 | 13.4 | 13.4 | 15 | 13 |
| PEG MW 2000 | kg | 2.05 | 0 | 0 | 0 | 2 |
| 1,4 butanediol | kg | 2.30 | 2.4 | 2.4 | 2.3 | 2.3 |
| dioctyladipate | kg | 2.9 | 2.9 | 3.7 | 0 | 0 |
| dipropylenglycol dibenzoate | Kg | 0 | 0 | 0 | 6.6 | 6.6 |

To the mixture of reactants is added a catalyst suitable for transesterification (150 ppm of titanium tetrabutylate catalyst) by agitating and heating the reactants to bring the temperature of the aforesaid mixture to about 200° C. After a short time, the esterification/transesterification reaction starts, indicated by the increase of the top temperature of the distillation column (60-70° C.), which is evidence of the distillation of methanol in a stoichiometric quantity with respect to the % of reactants loaded. The temperature of the mass is gradually raised to 205° C. and maintained constant until the complete distillation of the methanol.

When the distillation step, and thus the esterification/transesterification reaction is finished, it is added:

150 ppm of titanium tetrabutylate catalyst;
4000 ppm of Irganox 1330 phenolic stabiliser.

At this point, the mass is transferred from the autoclave/transesterification reactor to a polycondensation reactor.

Maintaining the temperature of the diathermic oil that heats the reactor to 230° C., application of vacuum through the condenser of the rector is started. The mixture of reactants is brought from environmental pressure to a residual pressure of about 150 mbar. The mass is heated to a temperature of 250° C. and simultaneously the pressure is brought up to 80 mbar. Having reached this value, it is continued by turning off the heating and bringing the residual vacuum to 1 mbar. At this point, the polycondensation reaction starts and continues until the desired viscosity is reached. The viscosity of the polymer is proportional to the torque exerted by the agitator of the reactor.

The polymer thus obtained is passed through a static mixer by lowering the temperature of the polymer and adding dioctyladipate (saturated ester; Examples 1, 2 and 3) or dipropylene glycol dibenzoate (saturated ester; examples 4 and 5) to the polymer mass.

At this point, the polymer with dioctyladipate or dipropylene glycol dibenzoate added is discharged and granulated through a wire-cutting unit (cutting in water with Automatik type cutter).

The polymer compositions obtained according to examples 1, 2, 3, 4 and 5 have been used to produce several samples of manufactured articles by injection moulding. The properties of the manufactured articles obtained are shown in Table 3 below:

TABLE 3

|  |  | Example 1 | Example 2 | Example 3 | Example 4 | Example 5 |
|---|---|---|---|---|---|---|
| MVR 190° C./2.16 kg (ASTM D1238) | cm$^3$/10 min | 120 | 61 | 85 | 72 | 134 |
| DENSITY g/cm$^3$ (ASTM D792) | g/cm$^3$ | 1.046 | 1.038 | 1.034 | 1.088 | 1.089 |
| SHORE A 15" (ASTM D2240) |  | 68 | 71 | 67 | 67 | 68 |
| Tensile strength at break (ISO 37) | MPa | 11 | 18.1 | 17.1 | 14 | 10.4 |
| Tensile elongation at break (ISO 37) | % | 1115 | 1335 | 1360 | 1372 | 1000 |
| Melting point (Internal Method) | ° C. | 143 | n/d | n/d, | 150 | 136 |

In Table 3, MVR (Mass Volume Rate) indicates the flow rate of the molten volume.

In all five cases, the manufactured articles had a surface resistivity in the order of $10^{10}\Omega$ and a volume resistivity in the order of 100 MΩ. To the compositions of Examples 1 manufactured articles had a surface resistivity in the order of $10^{10}\Omega$ and a volume resistivity in the order of 120 MΩ.

Table 4 shows the percentages by weight of the various components that constitute the final polymer composition of the five Examples 1, 2, 3, 4 and 5:

TABLE 4

|  |  | Example 1 | Example 2 | Example 3 | Example 4 | Example 5 |
|---|---|---|---|---|---|---|
| Thermoplastic copolyester elastomer | % by weight | 86.3 | 85 | 82 | 75 | 75 |
| Dioctyladipate (saturated ester) | % by weight | 13.7 | 15 | 18 | 0 | 0 |
| dipropylenglycol dibenzoate | % by weight | 0 | 0 | 0 | 25 | 25 |
| Physical expanding agent | % by weight | 0 | 0 | 0 | 0 | 0 |
| Chemical expanding agent | % by weight | 0 | 0 | 0 | 0 | 0 | and 4, physical expanding agents were added, consisting of microspheres with a blowing agent, and chemical expanding agents, of the gas-developing type, composed of sodium bicarbonate and citric acid. To the composition of Example 1 the physical expanding agents were added in the percentage of 3% and the chemical expanding agents were added in the percentage of 3%. To the composition of Example 4 the physical expanding agents were added in the percentage of 4% and the chemical expanding agents were added in the percentage of 1%. The % refers to the total polymer composition. These additives were added to the finished polymer composition using a twin-screw compounding extruder, maintaining the temperature profile in the extruder below 130° C.

Such polymer compositions with the addition of the aforesaid expanding agents were injection moulded with a temperature profile between 130° C. and 170° C., obtaining two samples of final expanded manufactured article, having the same properties listed in Table 3 for Examples 1 and 4, with the exception of the density, which was equal to 0.51 g/cm$^3$ for the Example 1 with expanding additives and equal to 0.49 g/cm$^3$ for the Example 4 with expanding additives, and the hardness was 60 Shore A for both. In both cases, the Table 5 shows the percentages by weight of the various components that constitute the final polymer composition of the two manufactured articles obtained by adding physical and chemical expanding agents to the compositions of Examples 1 and 4:

TABLE 5

|  |  | Example 1 With additive | Example 4 With additive |
|---|---|---|---|
| Thermoplastic copolyester elastomer | % by weight | 81.13 | 71.25 |
| Dioctyladipate (saturated ester) | % by weight | 12.87 | 0 |
| dipropylenglycol dibenzoate | % by weight | 0 | 23.75 |
| Physical expanding agent | % by weight | 3 | 4 |
| Chemical expanding agent | % by weight | 3 | 1 |

The invention allows obtaining many advantages in part already described.

The polymer composition based on thermoplastic copolyester elastomers according to the invention has, already at the end of the polymer production process, characteristics such as to allow the production of manufactured articles with hardness values significantly lower than those obtainable with thermoplastic copolyester elastomers of known type, without introducing thermoplastic polymers.

As shown in the above examples, depending on whether it is the expanded or compact version, the hardness values range from 50 to 75 Shore A. All this is achieved without affecting the mechanical and processing properties of the basic copolyester, elastomer, as pointed out in examples provided previously.

The polymer composition according to the invention is thus particularly suitable for the injection moulding in fields of application such as the automotive, technical sports accessories, fashion items and coatings industries and, in particular, soles for footwear.

According to a particular embodiment, the polymer composition according to the invention allows producing manufactured articles with permanent anti-static characteristics. These properties are particularly appreciated in the case in which the manufactured article is a sole for footwear, in particular safety shoes. Thus, manufactured articles, such as soles for footwear, can be obtained (both in the compact version and the expanded version), that have clear anti-static characteristics of the permanent type, without the use of additives that temporarily provide this characteristic.

According to a particular embodiment, the polymer composition according to the invention can be provided with the capacity of self-expansion so as to simply produce manufactured articles with particularly marked characteristics of lightness. Such self-expanding compositions allow achieving densities in the range of 0.3 to 0.8 g/ml, while maintaining appreciable physical mechanical characteristics.

The polymer composition according to the invention, in its self-expanding version, thus offers benefits in terms of lightness similar to those of EVA, but using a transformation technology (injection moulding) that is much simpler and more economical.

The invention thus allows obtaining a polymer composition according to the invention and thus obtaining a polymer composition based on thermoplastic copolyester elastomers with different characteristics than those normally expected from a thermoplastic copolyester elastomer, but which are of particular importance for the above-mentioned fields of application and particularly in the field of footwear where the particular characteristics of the claimed polymer composition (fatigue strength and elastic modulus) can be much improved compared to commonly used materials (TPU thermoplastic polyurethane, SBS styrene butadiene styrene, SEBS styrene ethylene butadiene styrene).

Finally, the production process of the polymer composition based on thermoplastic copolyester elastomers according to the invention is simple to manage, since it involves the use of standard equipment.

Therefore, the invention thus conceived achieves the predefined purposes.

Obviously, it may even assume, in its practical embodiment, forms and configurations different from that illustrated above without, for this reason, departing from the present scope of protection.

The invention claimed is:
1. Polymer composition based on thermoplastic copolyester elastomer comprising:
from 90% to 70% by weight of the thermoplastic copolyester elastomer, wherein the thermoplastic copolyester elastomer contains ester and ether bonds;
from 5% to 25% by weight of one or more saturated esters with a molecular weight between about 200 and 1,000;
from 2 to 10% by weight of expanding additives.
2. Polymer composition according to claim 1, wherein said one or more saturated esters are present in the composition from 5% to 20% by weight.
3. Polymer composition according to claim 1, wherein said thermoplastic copolyester elastomer has an alternating structure defined by a multiplicity of randomly recurring long-chain ester units and short-chain ester units, joined together by head-to-tail chaining through ester bonds, in which the long-chain ester units are represented by the formula:

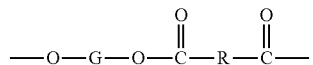

and wherein the short-chain ester units are represented by the formula:

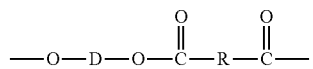

where:
G is a divalent group that remains after removal of terminal hydroxyl groups from a polyol having a molecular weight between about 250 and 6000;
R is a divalent group that remains after removal of carboxyl groups from a dicarboxylic acid having a molecular weight less than about 300;
D it is a divalent group remaining after removal of hydroxyl groups from a diol having a molecular weight less than about 250.
4. Polymer composition according to claim 3, wherein said alternating-structure thermoplastic copolyester elastomer is obtained by:
esterification/transesterification of one or more dicarboxylic acids, of one or more esters of dicarboxylic acids and/or of one or more dimer or trimer carboxylic acids with diols and with diol polyglycols, the esters of dicarboxylic acids and the dimer or trimer carboxylic acids having a molecular weight greater than 300 and the corresponding carboxylic acid having a molecular weight less than 300; and
subsequent polycondensation of the products of esterification/transesterification.
5. Polymer composition according to claim 4, wherein the long-chain ester units are the reaction products of the esterification/transesterification of one or more diol polyglycols selected from the group consisting of: polytetramethylene glycols; polypropylene glycols and their copolymers derived from ethylene oxide; polyoxyethylene glycols; polybutadiene glycols; polycarbonates glycols; diol polycaprolactones; and diols from dimer acid.
6. Polymer composition according to claim 5, wherein the one or more diol polyglycols are selected from the group consisting of poly(tetramethylene ether) glycol (PTMEG), polyoxyethylene glycol (PEG), and a mixture of the two.
7. Polymer composition according to claim 3, wherein the short-chain ester units are the reaction products of the esterification/transesterification of one or more diols with molecular weight not greater than 250.

8. Polymer composition according to claim 7, wherein said one or more diols are selected from aliphatic diols.

9. Polymer composition according to claim 4, wherein said one or more dicarboxylic acids are selected from the group consisting of aliphatic, cycloaliphatic, and aromatic dicarboxylic acids with a molecular weight below about 300, and mixtures thereof.

10. Polymer composition according to claim 4, wherein said one or more esters of dicarboxylic acids are selected from the group consisting of dimethyl esters of the following acids: adipic acid; mixtures of adipic acid, succinic acid and sebacic acid; terephthalic acid; isophthalic acid; azelaic acid; cyclohexanedicarboxylic acid; naphthalene dicarboxylic acid, and mixtures thereof.

11. Polymer composition according to claim 1, wherein said one or more saturated esters are selected from the group consisting of diethylhexyl adipate, dipropylene glycol dibenzoate, diethylene glycol dibenzoate, triethyl citrate, and mixtures thereof.

12. Polymer composition according to claim 1, wherein said one or more saturated esters with a molecular weight between about 200 and 1,000 are:
   added to the thermoplastic copolyester elastomer at the end of a polycondensation reaction while the thermoplastic copolyester is in a molten state; or
   added to the thermoplastic copolyester elastomer while the thermoplastic copolyester is in a solid granulated state.

13. Polymer composition according to claim 1, wherein said expanding additives are constituted by a mixture of physical and chemical expanding agents.

14. Polymer composition according to claim 1, wherein said expanding additives are constituted by:
   1.5% to 5.0% by weight of physical expanding agents; and
   0.5% to 5.0% by weight of chemical type expanding agents.

15. Polymer composition according to claim 1, wherein said expanding additives are present in the composition from 3% to 6% by weight of the composition.

16. Polymer composition according to claim 15, wherein said expanding additives are constituted by:
   2.5% to 4.5% by weight of physical expanding agents; and
   0.5% to 1.5% by weight of chemical type expanding agents.

17. Polymer composition according to claim 1, wherein said expanding additives are added under mixing to:
   the thermoplastic copolyester elastomer at the end of a polycondensation reaction while the thermoplastic copolyester is in a molten state and at a temperature not exceeding 130-135° C. to prevent decomposition of the expanding additives, or
   the thermoplastic copolyester elastomer in an extruder while the thermoplastic copolyester is in a molten state and at a temperature not exceeding 130-135° C. to prevent decomposition of the expanding additives.

18. Polymer composition according to claim 1,
   wherein the thermoplastic copolyester elastomer comprises polymer segments having divalent groups,
   wherein the polymer segments having divalent groups are present in the thermoplastic copolyester elastomer at a concentration of from 5% to 20% by weight of the thermoplastic copolyester elastomer, and
   wherein the polymer segments having divalent groups are provided by removing terminal hydroxyl groups from a polyethylene glycol having a molecular weight between 400 and 4,000.

19. Polymer composition according to claim 1, characterised in that it is in the form of granules, pellets or flakes obtained by extrusion and cutting or granulation of said polymer composition.

20. Manufactured article obtained by injection moulding of a predefined amount of the polymer composition according to claim 1, said manufactured article having an expanded structure induced by the activation of said expanding additives during the injection of the polymer composition in a molten state.

21. Manufactured article according to claim 20, characterised in that it has a density of between 0.3 g/cm3 and 0.8 g/cm3.

22. Manufactured article according to claim 20, characterised in that it has a hardness between 50 and 70 Shore A.

23. Manufactured article according to claim 20, obtained by injection moulding of a predefined amount of the polymer composition,
   wherein the thermoplastic copolyester elastomer of said polymer composition comprises polymer segments having divalent groups,
   wherein the polymer segments having divalent groups are present in the thermoplastic copolyester elastomer at a concentration of from 5% to 20% by weight of the thermoplastic copolyester elastomer,
   wherein the polymer segments having divalent groups are provided by removing terminal hydroxyl groups from a polyethylene glycol having a molecular weight between 400 and 4000, and
   wherein said manufactured article has a surface resistivity in the order of $10^{10}\Omega$ and a volume resistivity in the order of 120 MΩ.

24. Manufactured article according to claim 20, characterised in that it is a sole for footwear.

25. Production process of the polymer composition based on thermoplastic copolyester elastomer according to claim 1, comprising the following operating steps:
   a) introducing in a first reactor one or more dicarboxylic acids, one or more esters of dicarboxylic acids and/or one or more dimer or trimer carboxylic acids, the esters of dicarboxylic acids and the dimer or trimer carboxylic acids having a molecular weight greater than 300 and the corresponding carboxylic acid having a molecular weight less than 300;
   b) introducing in said first reactor diols and diol polyglycols to mix them with the one or more dicarboxylic acids, one or more esters of dicarboxylic acids and/or one or more dimer or trimer carboxylic acids;
   c) inducing in said first reactor between the reactants in steps a) and b) reactions of esterification/transesterification;
   d) transferring the reaction products of esterification/transesterification in a second reactor and inducing polycondensation reactions of said reaction products to obtain a thermoplastic copolyester elastomer;
   e) adding to said thermoplastic copolyester elastomer one or more saturated esters with a molecular weight between about 200 and 1,000, in an amount such that said saturated esters constitute from 5% to 25% by weight of the total polymer composition;
   f) granulating the polymer composition to bring it in the form of solid granules or pellets; and g) adding to the thermoplastic copolyester elastomer a mixture of physical and chemical expanding agents at the end of a polycondensation reaction or in granulation step f) while the thermoplastic copolyester elastomer is in a molten state, wherein before step a), the thermoplastic copolyester elastomer is brought to a temperature not exceeding 130° C.

26. Production process according to claim 25, wherein step e) is performed at the end of a polycondensation reaction or simultaneously with step f), while the thermoplastic copolyester elastomer is in a molten state.

27. Production process according to claim 25, wherein the mixture of reactants is constituted by:

from 20% to 40% by weight of one or more dicarboxylic acids, one or more esters of dicarboxylic acids and/or one or more dimer or trimer carboxylic acids; and from 60 to 80% of a mixture of diols and diol polyglycols.

28. The polymer composition according to claim 1, wherein the one or more saturated esters have a molecular weight between 300 and 380.

29. The polymer composition according to claim 3, wherein the alternating structure comprises from 5% to 15% by weight of short-chain ester units and from 70% to 80% by weight of long-chain ester units.

30. The polymer composition according to claim 8, wherein said one or more diols are selected from the group consisting of monoethylene glycol, diethylene glycol, hexanediol, propanediol, and 1,4-butanediol.

31. The polymer composition according to claim 7, wherein the short-chain ester units are the reaction products of the esterification/transesterification of 1,4-butanediol.

32. The polymer composition according to claim 9, wherein the one or more dicarboxylic acids are selected from the group consisting of adipic acid; mixtures of adipic acid, succinic acid and sebacic acid; terephthalic acid; isophthalic acid; azelaic acid; cyclohexanedicarboxylic acid; and naphthalene dicarboxylic acid.

33. The polymer composition according to claim 32, wherein the one or more dicarboxylic acids are selected from the group consisting of terephthalic acid, isophthalic acid, and a mixture thereof.

34. The polymer composition according to claim 10, wherein the one or more esters of dicarboxylic acids are selected from the group consisting of terephthalic acid, isophthalic acid, and a mixture thereof.

35. The polymer composition according to claim 11, wherein the one or more saturated esters are selected from the group consisting of diethylhexyl adipate, dipropylene glycol dibenzoate, diethylene glycol dibenzoate, triethyl citrate, acetyltributylcitrate, and acetyl triethyl citrate.

36. The polymer composition according to claim 13, wherein the chemical expanding agents have a weight ratio of between 1:1 and 1:10.

37. The polymer composition according to claim 13, wherein the chemical expanding agents have a weight ratio of between 1:1 and 1:4.

38. The polymer composition according to claim 14, wherein the physical expanding agents comprise microspheres with a swelling agent.

39. The polymer composition according to claim 14, wherein the chemical expanding agents comprise gas-developing type agents comprised of sodium bicarbonate and citric acid.

40. The polymer composition according to claim 16, wherein the physical expanding agents comprise microspheres with a swelling agent.

41. The polymer composition according to claim 16, wherein the chemical expanding agents comprise gas-developing type agents comprised of sodium bicarbonate and citric acid.

42. The polymer composition according to claim 18, wherein the polyethylene glycol has a molecular weight between 1,000 and 3,000.

43. The polymer composition according to claim 42, wherein the polyethylene glycol has a molecular weight of 2,000.

44. The manufactured article according to claim 23, wherein the polyethylene glycol has a molecular weight between 1,000 and 3,000.

45. The manufactured article according to claim 44, wherein the polyethylene glycol has a molecular weight of 2,000.

46. The production process according to claim 25, wherein the one or more saturated esters have a molecular weight of between 300 and 380.

* * * * *